Sept. 10, 1957 H. H. WOLFE ET AL 2,805,835
VALVE STRUCTURE
Original Filed April 30, 1952
2 Sheets-Sheet 1
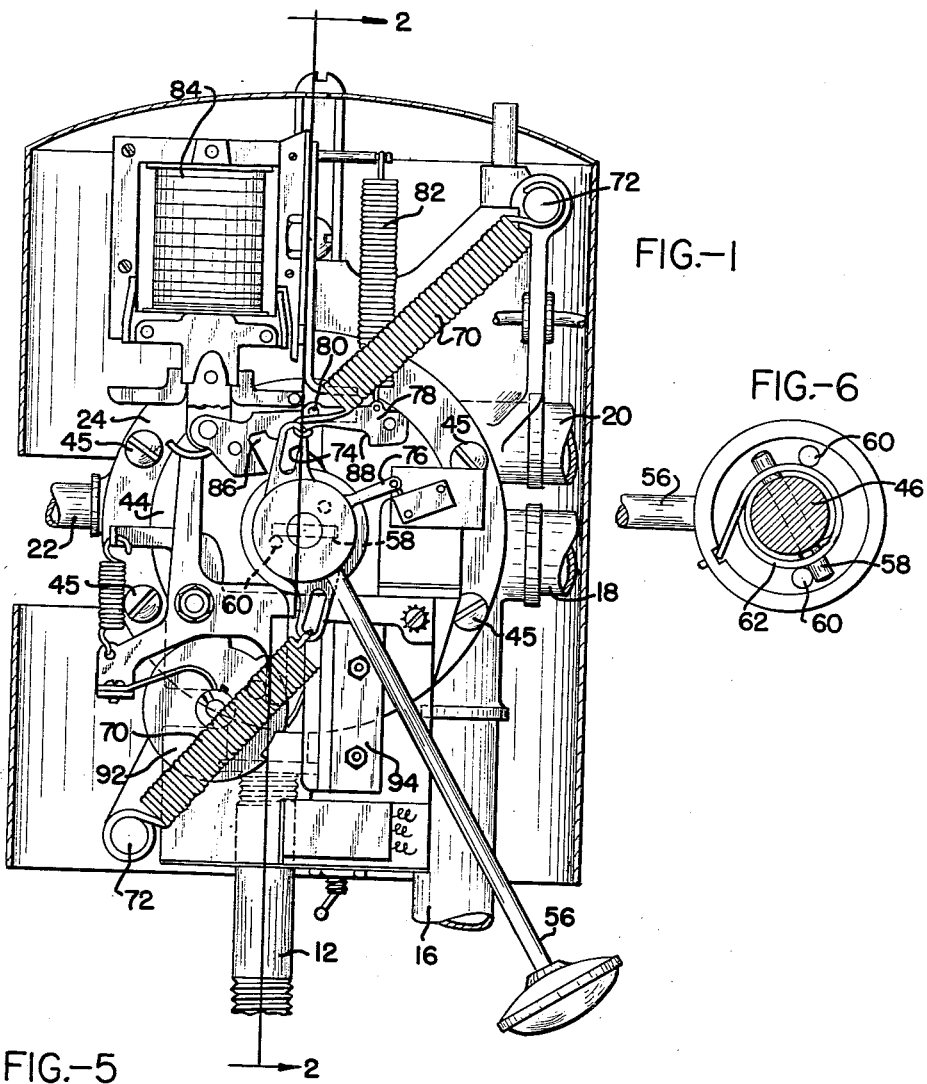
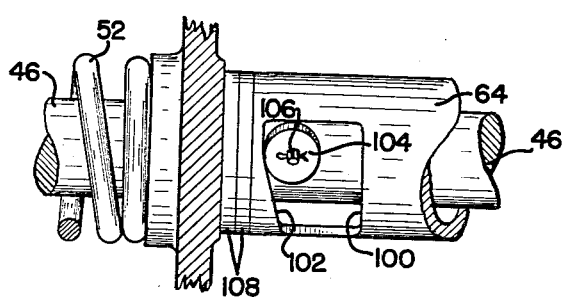
INVENTOR.
H. HIX WOLFE
RAYMOND ERISMAN JR.
BY Toulmin & Toulmin
ATTORNEYS Sept. 10, 1957 H. H. WOLFE ET AL 2,805,835
VALVE STRUCTURE
Original Filed April 30, 1952 2 Sheets-Sheet 2
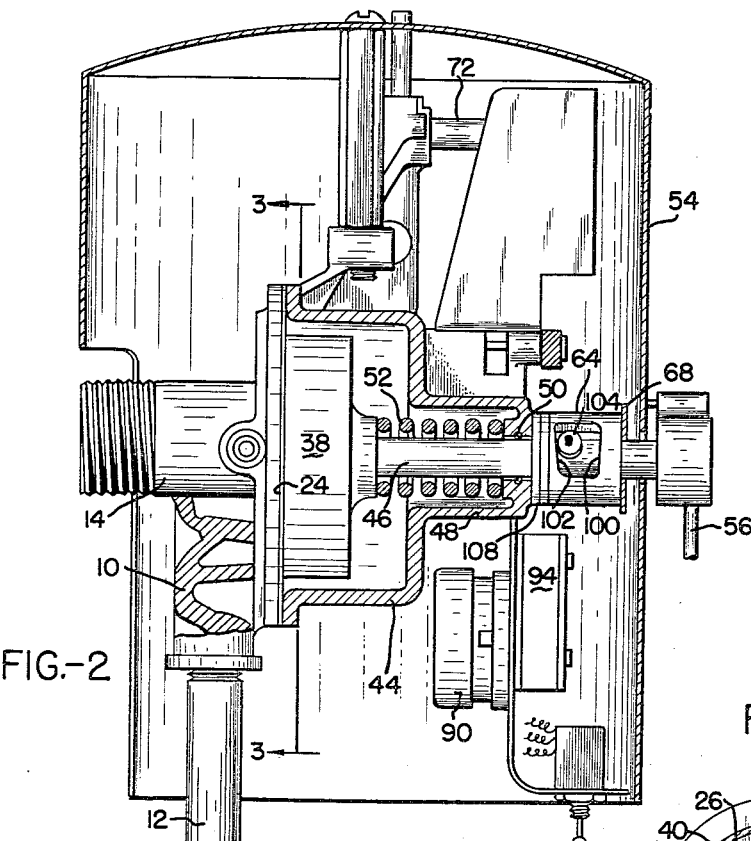
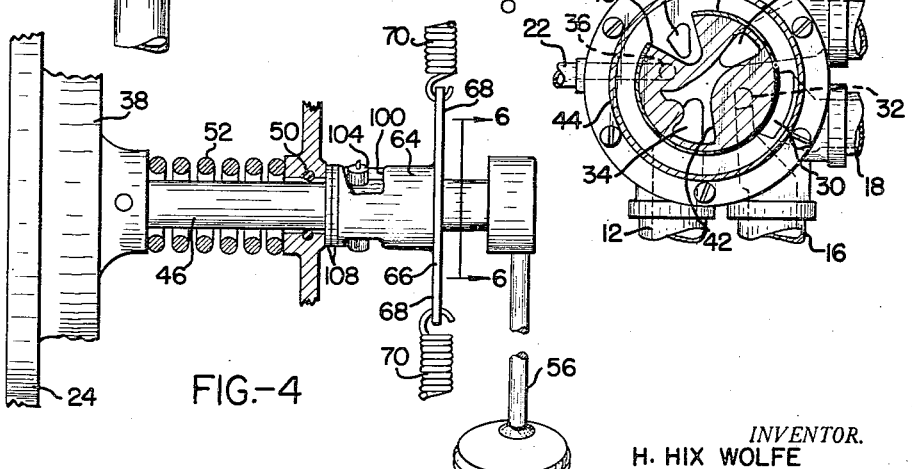
INVENTOR.
H. HIX WOLFE
RAYMOND ERISMAN JR.
BY
Toulmin & Toulmin
ATTORNEYS United States Patent Office 2,805,835
Patented Sept. 10, 1957

2,805,835

VALVE STRUCTURE

H. Hix Wolfe and Raymond Erisman, Jr., Dayton, Ohio, assignors to The Duro Co., Dayton, Ohio, a corporation of Ohio Original application April 30, 1952, Serial No. 285,156, now Patent No. 2,753,933, dated July 10, 1956. Divided and this application December 1, 1954, Serial No. 472,373

8 Claims. (Cl. 251—162)

This invention relates to valves, particularly to valves for water softening systems and the like, and is a division of our co-pending application, Serial No. 285,156, filed April 30, 1952, now Patent No. 2,753,933 granted July 10, 1956.

In the water softening arrangement illustrated in our co-pending application referred to above there is a control valve for controlling the flow of water through the softener during service and regeneration thereof which comprises a flat port plate and a valve member having channels and passages therein bearing against the flat port plate and rotatable thereon for controlling fluid flow between the ports and the port plate.

A valve of the nature referred to has the advantage of being simple to construct, compact, and easy to arrange to accomplish the several connections referred to, but embodies the disadvantage that there is a substantial area of the valve member and the port plate in engagement which causes it to be difficult to rotate the valve member on the port plate at times. This is particularly true when the valve member is pressed against the port plate, and also when the valve member may consist of a resilient or rubber-like material in order to maintain a good seal between the valve member and the port plate.

In connection with the valve illustrated in our co-pending application referred to above, a valve member is urged against the port plate by a spring and, additionally, the pressure of the hard water being delivered to the softening arrangement is permitted to stand on the back of the valve member to press it against the port plate and maintain a good seal therebetween.

Having the foregoing in mind, it is a particular object of the present invention to provide a valve structure of the nature referred to in which the advantages of the flat-disc-type valve are retained while the disadvantages associated therewith, particularly as to the difficulty of shifting thereof, are eliminated.

Another object of the present invention is the provision of a disc-type valve especially adapted for use in connection with water softening systems, in which the valve member is pressed tightly against the cooperating port plate to maintain a good seal therebetween, and wherein this sealing pressure does not prevent the easy shifting of the valve member.

A still further object of the present invention is the provision of an arrangement for lifting the valve member in a disc-type valve off the port plate thereof during shifting movements of the valve member and to permit easy movement thereof.

These and other objects and advantages of this invention will become more apparent upon reference to the following specification, taken in connection with the accompanying drawings, wherein:

Figure 1 is an elevational view showing a valve and control means therefor according to our invention located within a housing and with the housing being in section;

Figure 2 is a vertical sectional view indicated by line 2—2 on Figure 1;

Figure 3 is a sectional view indicated by line 3—3 on Figure 2 showing the ports in the port plate and the passages in the valve member cooperating therewith;

Figure 4 is a fragmentary sectional view showing the mechanism for moving the valve member in a somewhat different position than it occupies in Figure 2;

Figure 5 is an enlarged fragmentary view showing the arrangement for reducing the pressure of the valve member on the port plate when the valve member is to be shifted; and Figure 6 is a sectional view indicated by line 6—6 on Figure 4 showing a lost motion mechanism in connection with the shifting handle for the valve member.

Referring to the drawings somewhat more in detail, Figures 1 and 2 will show that the valve according to this invention comprises a valve body 10 having a plurality of threaded ports for connection with the pipes that form a part of the conduit system of the softening arrangement.

One of the threaded ports is at the bottom of the valve body and receives a pipe 12 leading to one end of the softening tank of the system (not shown) within which a re-agent, such as zeolite, is contained.

In the back of the valve body is a hollow extension 14 for connection with a pipe leading to the end of the softening tank opposite pipe 12. Adjacent the port receiving pipe 12 in the bottom of the valve body is another threaded port that receives the pipe 16 that leads to drain.

In the right side of the valve body, as it is viewed in Figures 2 and 3, are a pair of threaded ports, the lower one of which receives a pipe 18 which is the hard water inlet pipe, and the upper one of which receives a pipe 20 through which the softened water goes to service.

On the side of the valve body opposite the pipes 18 and 20 is another threaded part, to which is connected pipe 22 that leads to a brine tank.

Located within the valve body is a plurality of internal passages, rather diagrammatically illustrated in Figure 3, and mounted on the valve body enclosing the said passages is a port plate 24 being provided with a plurality of ports opening into the passages. For example, port 26 is connected with extension 14; port 28 is connected with pipe 20; port 30 is connected with pipe 18; port 32 is connected with pipe 16; and port 34 is connected with pipe 12.

In addition, there is a port 36 leading to a small ejector (not shown), the suction side of which is connected to pipe 22 while the discharge side opens into extension 14.

For controlling the connections between the several ports referred to there is a rotatable valve member 38 which is a disc-like member that rests flat against port plate 24. Valve member 38 comprises a notch 40 and a generally transverse groove 42 which, when the valve member is rotated, effect the necessary connections between the ports of the port plate for backwashing the softening tank, then supplying brine to the softening tank, then rinsing the softening tank, and then restoring the tank to service. As illustrated in Figure 3, the valve member is interconnecting the ports so that a supply of soft water is going to service through pipe 20.

Mounted on the valve body, and enclosing valve member 38, is a dome-like cover 44 which is retained in position on the valve body by screws 45. It will be noted that the port 30, through which hard water enters the softening system, is located outwardly of the periphery of valve member 38. Because of this the inside of cover 44 is continuously under hard water inlet pressure, with that pressure standing on the back face of valve member 38 and urging it toward port plate 24, Valve member 38 has fixed thereto, and extending outwardly therefrom, a shaft 46. An extension 48 on cover 44 surrounds shaft 46 and may be sealed thereto, as by the O ring 50, to prevent leakage of water from between the shaft and cover. Extension 48 is availed of for enclosing a compression spring 52 which also urges valve member 38 toward port plate 24.

Shaft 46 projects outwardly through a cover member 44 and carries a shifting handle 56. Handle 56 has limited free rotation on shaft 46 by virtue of transverse pin 58 on the shaft and the axial pins 60 carried by the handle. Torsion spring 62 biases the handle on the shaft in one direction.

According to the present invention handle 56 is availed of for shifting the valve member in only one direction, namely, counter-clockwise, as it is viewed in Figures 1 and 3. For shifting the valve member in the opposite direction there is mounted about shaft 46 a sleeve member 64, to which is affixed a plate 66 that has slotted extensions 68. Slotted extensions 68 receive the ends of tension springs 70 which have their other ends anchored on posts 72 that are an integral part of the cover 44.

In Figure 1 it will be noted that the slots 74 in the extensions 68 of plate 66 are inclined at an angle from a radial direction and, because of this, when the valve member is rotated counter-clockwise from its Figure 1 position, the ends of the springs in the slots will slide downwardly, thereby providing for certain bias on the valve member; whereas, when the valve member rotates back toward its Figure 1 position, the ends of the springs will slide outwardly in the said slots and maintain substantially the same bias on the valve member.

In this manner sufficient bias is always exerted on the valve member without this bias becoming excessive in the extreme shifted position of the valve member.

Sleeve 64 also carries a latch finger 76 adapted for cooperation with a latch member 78 pivoted at 80 to the stationary part of the valve structure. Latch member 78 is urged upwardly at the right end thereof, as it is viewed in Figure 1, by a tension spring 82 and is adapted for having its other end pulled upwardly by energization of the solenoid 84. The latch member is provided with a first recess 86 for engaging finger 76 and a second recess or shoulder 88 for engaging the said finger.

In operation, with the solenoid 84 de-energized, the handle 56 is availed of for rotating the sleeve and valve member counter-clockwise until finger 76 engages recess 86. Thereafter, after a predetermined period of time, a timing motor 90 drives a cam 92 connected therewith to a point where the cam will actuate limit switch 94 and cause energization of solenoid 84. This will lift the left end of latch member 78 upwardly and release finger 76 so that spring 70 will turn the valve member clockwise until the finger strikes shoulder 88.

At a predetermined further interval of time the motor 90 will move cam 92 to a position where switch 94 will again de-energize solenoid 84, at which time spring 82 will pull the right end of latch member 78 upwardly and release finger 76 so that the valve member will return to the position in which it is illustrated in Figure 1.

It has been mentioned before that the shifting of a valve member of the nature of valve member 38 is difficult due to the friction with which it engages the port plate. This is particularly true in connection with a valve of the nature disclosed where the inlet pressure to the valve is utilized for pressing the valve member against the port plate.

According to the present invention the difficulty of shifting the valve member is completely eliminated by providing sleeve 64 with a pair of apertures 100, the sides of which, adjacent the cover member, are inclined as at 102.

Extending into apertures 100 are rollers 104 mounted on the opposite ends of a pin 106 extending through shaft 46. When the valve member is fully seated on the port plate rollers 104 have at least a slight clearance from the lower end of incline 102, but when sleeve 64 is rotated in its clockwise direction, as it is view in Figure 1, or the shaft 46 is rotated in the opposite direction, the rollers will engage the inclines and lift the valve member from engagement with port plate 24, thus overcoming the friction between the valve member and the port plate and permitting easy rotation of the valve member.

Preferably, thrust bearing 108 is provided between the outer end surface of cover 44 and the inner end of sleeve 64 to eliminate friction and wear at that point.

It will be noted that handle 56 is availed of only for rotating the member counterclockwise as viewed in Figure 1, while springs 70 are availed of for rotating the member in the opposite direction. Since handle 56 is associated with shaft 46 and springs 70 are associated with sleeve 64, it follows that whenever the valve member is shifted advantage is taken of the rollers 104 and inclined surfaces 102 of the sleeve 64 thereby relieving the pressure between the valve member and the port plate, thus leading to easy shifting of the valve member.

It will be appreciated that the degree of incline of inclined surfaces 102 is such that the spring 52 will prevent the valve member from being separated widely from the port plate, because any substantial spacing between the valve member and the port plate will immediately be offset by the rollers running downwardly on the inclined surfaces due to the influence of the spring.

It will also be noted that, because of the lost motion connection of the handle 56 with shaft 46, the valve member can be snapped in its clockwise direction by the springs 70 without any accompanying movement of the handle 56.

It will be understood that this invention is susceptible to modification in order to adapt it to different usages and condtions and, accordingly, it is desired to comprehend such modifications within this invention as may fall within the scope of the appended claims.

We claim:

1. In a control valve; a valve body having passages theerin and having a flat face with ports therein communicating with said passages, a rotatable valve member having a flat face engaging the flat face of the valve body and including passage means for controlling the ports when the valve member is rotated, a shaft connected with said valve member, a cover on said valve body enclosing said valve member, a pressure port in said valve body being located outwardly of the periphery of said valve member whereby pressure stands within said cover and urges the valve member toward the flat surface of the valve body, first means to rotate the valve member in one direction, second means to rotate the valve member in the opposite direction, and means for relieving the pressure between said valve member and said valve body for permitting easy rotation of said valve member relative to said valve body operable automatically in response to the operation of either of said first or second means.

2. In a control valve for a water softener; a valve body having a flat face, a valve rotor having a flat face engaging the face of the body to control the valve passages, a shaft to turn the valve member, a sleeve rotatable on the shaft spring biased in one direction, a roller on the shaft, and a helical cam surface on the sleeve engaging the roller so inclined that rotation of the sleeve in the one direction or rotation of the shaft in the opposite direction will lift the valve member off the flat face of the valve body.

3. In a control valve for a water softener; a valve body having a flat face having ports therein one of which is an inlet port normally under pressure, a disc valve rotor engaging the face rotatable for controlling fluid flow between the ports and the said inlet port being located beyond the periphery of the rotor, a cover on the body enclosing the rotor whereby pressure from said inlet part will bear on the back of the rotor, a shaft connected to the rotor extending through the cover, a radial roller on the shaft outside the cover, a sleeve rotatable on the shaft abutting the cover having a helical cam surface engaging the roller on the side thereof toward the cover, said cam surface being inclined so rotation of the sleeve on the shaft in one direction or rotation of the shaft in the sleeve in the other direction will lift the rotor off the face of the valve body to facilitate rotation thereof, and spring means biasing said sleeve in the said one direction.

4. In a control valve for a water softener; a valve body having a flat face having ports therein one of which is an inlet port normally under pressure, a disc valve rotor engaging the face rotatable for controlling fluid flow between the ports and the said inlet port being located beyond the periphery of the rotor, a cover on the body enclosing the rotor whereby pressure from the inlet part will bear on the back of the rotor, a shaft connected to the rotor extending through the cover, a radial roller on the shaft, a sleeve rotatable on said shaft and abutting the cover having a helical cam surface engaging the roller on the side thereof toward the cover so rotation of the sleeve on the shaft in one direction or rotation of the shaft in the sleeve in the other direction will lift the rotor off the face of the valve body to facilitate rotation thereof, an abutment at one end of the cam to engage the roller to limit relative rotation between the shaft and sleeve, spring means biasing said sleeve in one direction, and means on the cover for halting the sleeve in one rotated position.

5. In a control valve for a water softener; a valve body having passages therein, a valve member rotatable for controlling the passages, said valve body and valve member having interengaging flat faces, a shaft on said valve member, a sleeve surrounding said shaft, slotted arms extending from said sleeve, springs extending from the slotted arms to the valve body to bias the valve member toward one of its rotated positions, each said slot being at an angle to the spring pertaining thereto so that when the valve member is located in its said one rotated position the springs are in the outer ends of the slots and when the valve member is in another rotated position, in which position the springs are extended, the springs are in the inner ends of the slots, radial roller means carried by the shaft, and helical surfaces on the sleeve adapted for engaging said roller means and moving said shaft to lift the valve member off the valve body when the springs rotate said sleeve relative to the shaft.

6. In a control valve for a water softener; a valve body having a flat face having ports therein one of which is an inlet port normally under pressure, a disc valve rotor engaging the face rotatable for controlling fluid flow between the ports and the said one port being located beyond the periphery of the rotor, a cover on the body enclosing the rotor and the pressure from the inlet port thus bearing on the back of the rotor, a shaft connected to the rotor extending through the cover, a radial roller on the shaft outside the cover, a sleeve rotatable on the shaft having a helical cam surface engaging the side of the roller that is toward said cover, a thrust bearing between the sleeve and the cover, said cam surface being inclined so rotation of the sleeve on the shaft in one direction or rotation of the shaft in the sleeve in the other direction will lift the rotor off the face of the valve body to facilitate rotation thereof, and spring means biasing said sleeve in the said one direction.

7. In a control valve for a water softener; a valve body having a flat face having ports therein one of which is an inlet port normally under pressure, a disc valve rotor engaging the face rotatable for controlling fluid flow between the ports and the said inlet port being located beyond the periphery of the rotor, a cover on the body enclosing the rotor whereby pressure from said inlet port will bear on the back of the rotor, a shaft connected to the rotor extending through the cover, a radial roller on the shaft outside the cover, a sleeve rotatable on the shaft abutting the cover having a helical cam surface engaging the roller on the side thereof toward the cover, said cam surface being inclined so rotation of the sleeve on the shaft in one direction or rotation of the shaft in the sleeve in the other direction will lift the rotor off the face of the valve body to facilitate rotation thereof, means to limit the relative rotation of the sleeve and shaft, means for rotating the sleeve in the said one direction and the shaft in the said other direction, and a spring pressing the valve member toward the flat face of the valve body.

8. In a control valve for a water softener; a valve body having a flat face having ports therein one of which is an inlet port normally under pressure, a disc valve rotor engaging the face rotatable for controlling fluid flow between the ports and the said inlet port being located beyond the periphery of the rotor, a cover on the body enclosing the rotor whereby pressure from said inlet port will bear on the back of the rotor, a shaft connected to the rotor extending through the cover, a radial roller on the shaft outside the cover, a sleeve rotatable on the shaft abutting the cover, a helical surface on the sleeve engaging the cover side of the roller with an axial abutment at the high end of the surface to limit the relative rotation of the shaft and sleeve, the arrangement being such that rotation of the shaft and sleeve relatively in one direction will relieve the pressure of the valve rotor on the said face and rotate the valve rotor, and a spring within the cover urging the rotor toward the said face.

References Cited in the file of this patent

UNITED STATES PATENTS

| | | |
|---|---|---|
| 1,960,515 | Shield | May 29, 1934 |
| 2,153,559 | Hendricks | Apr. 11, 1939 |
| 2,226,169 | Koehler | Dec. 24, 1940 |
| 2,233,840 | Koehler | Mar. 4, 1941 |
| 2,406,483 | Van Epps | Aug. 27, 1946 |
| 2,451,678 | Johnson | Oct. 19, 1948 |
| 2,503,612 | Burkhardt | Apr. 11, 1950 |
| 2,615,673 | Hinrichs | Oct. 28, 1952 |